United States Patent
Mihara (10) Patent No.: US 9,554,040 B2
(45) Date of Patent: Jan. 24, 2017

(54) MULTI-VIEWPOINT IMAGE CAPTURING METHOD AND IMAGE DISPLAY METHOD

(71) Applicant: Panasonic Intellectual Property Management Co., Ltd., Osaka (JP)

(72) Inventor: Kazuhiro Mihara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/667,498

(22) Filed: Mar. 24, 2015

(65) Prior Publication Data

US 2015/0278987 A1    Oct. 1, 2015

(30) Foreign Application Priority Data

Mar. 25, 2014   (JP) .................................. 2014-061349
Mar. 11, 2015   (JP) .................................. 2015-048029

(51) Int. Cl.
*G06T 15/10*   (2011.01)
*H04N 5/232*   (2006.01)
*G06T 3/00*    (2006.01)
*G06T 15/20*   (2011.01)

(52) U.S. Cl.
CPC ......... *H04N 5/23238* (2013.01); *G06T 3/0043* (2013.01); *G06T 15/205* (2013.01); *G06T 2207/10004* (2013.01); *G06T 2207/20004* (2013.01); *G06T 2207/20021* (2013.01); *G06T 2207/20068* (2013.01)

(58) Field of Classification Search
None
See application file for complete search history.

(56) References Cited

U.S. PATENT DOCUMENTS

| | | | |
|---|---|---|---|
| 6,184,892 B1 | 2/2001 | Toriu et al. | |
| 6,747,610 B1 | 6/2004 | Taima et al. | |
| 2006/0257032 A1* | 11/2006 | Nakagawa | G06T 17/20 382/232 |
| 2007/0053679 A1 | 3/2007 | Beniyama et al. | |
| 2010/0007715 A1* | 1/2010 | Lai | H04N 5/232 348/37 |
| 2012/0147200 A1* | 6/2012 | Watanabe | H04N 7/181 348/207.11 |

FOREIGN PATENT DOCUMENTS

| | | |
|---|---|---|
| JP | 06-020030 A | 1/1994 |
| JP | 10-198824 A | 7/1998 |
| JP | 11-055690 A | 2/1999 |
| JP | 2003-091744 A | 3/2003 |
| JP | 2007-072537 A | 3/2007 |

* cited by examiner

*Primary Examiner* — Kyle Zhai
(74) *Attorney, Agent, or Firm* — McDermott Will & Emery LLP (57) ABSTRACT

The present technique provides a method of capturing a multi-viewpoint image of an object with a rotation axis of the object optionally changed by a user and an image display method. The present technique is a multi-viewpoint image capturing method including shooting an object from a plurality of different viewpoints, and capturing a plurality of still images, wherein the object is placed at a center of a virtually set ICO sphere, and during the shooting of the object, the images of the object are captured from a vertex of the virtually set ICO sphere toward the center of the ICO sphere such that the plurality of still images are generated.

2 Claims, 12 Drawing Sheets

FIG. 22

MULTI-VIEWPOINT IMAGE CAPTURING METHOD AND IMAGE DISPLAY METHOD

RELATED APPLICATIONS

This application claims the benefit of Japanese Application No. 2014-061349, filed on Mar. 25, 2014 and Japanese Application No. 2015-048029, filed on Mar. 11, 2015, the disclosures of which Applications are incorporated by reference herein.

BACKGROUND

1. Field

The present technique relates to a method of capturing a multi-viewpoint image by shooting an object from various directions and an image display method.

2. Description of the Related Art

Unexamined Japanese Patent Publication No. H11-55690 discloses a method of capturing a multi-viewpoint image by shooting an object from various directions. As a result of displaying of the multi-viewpoint image which is captured by that method and changing a display of the image according to a user operation, the image can be displayed to a user as if the object is really in front of the user.

SUMMARY

The present technique provides a multi-viewpoint image capturing method including shooting an object from a plurality of different viewpoints, and capturing a plurality of still images, wherein the object is placed at a center of a virtually set icosahedron (ICO) sphere, and during the shooting of the object, the images of the object are captured from a vertex of the virtually set ICO sphere toward the center of the ICO sphere such that a plurality of still images are generated.

DETAILED DESCRIPTION

An image capturing method according to exemplary embodiments of the present technique will be described below with reference to the drawings. However, an excessively detailed description may be omitted. For example, a detailed description of an already well-known matter and a repetitive description of substantially the same configuration may be omitted. Such omissions are intended to prevent the following description from becoming unnecessarily redundant to facilitate understanding by those skilled in the art.

The inventor of the present technique provides the accompanying drawings and the description below for those skilled in the art to fully understand the present technique and does not intend to limit the subject matter described in the claims to the accompanying drawings and the description below.

First Exemplary Embodiment

An image capturing method of the present technique is a multi-viewpoint image capturing method including shooting an object from a plurality of different viewpoints, and capturing a plurality of multi-viewpoint still images. In the method, the object is placed at a center of a virtually set ICO sphere, and images of the object are captured from a vertex of the virtually set ICO sphere toward the center of the ICO sphere, so that a plurality of multi-viewpoint still images are obtained.

Further, when the images of the object are captured from the vertex of the virtually set ICO sphere toward the center of the ICO sphere, the images of the object are captured with a camera, which is an image capturing apparatus, controlled to be tilted to a plurality of different angles at one shooting position.

[1-1. External Appearance of the Image Capturing Apparatus]

Figure 1:
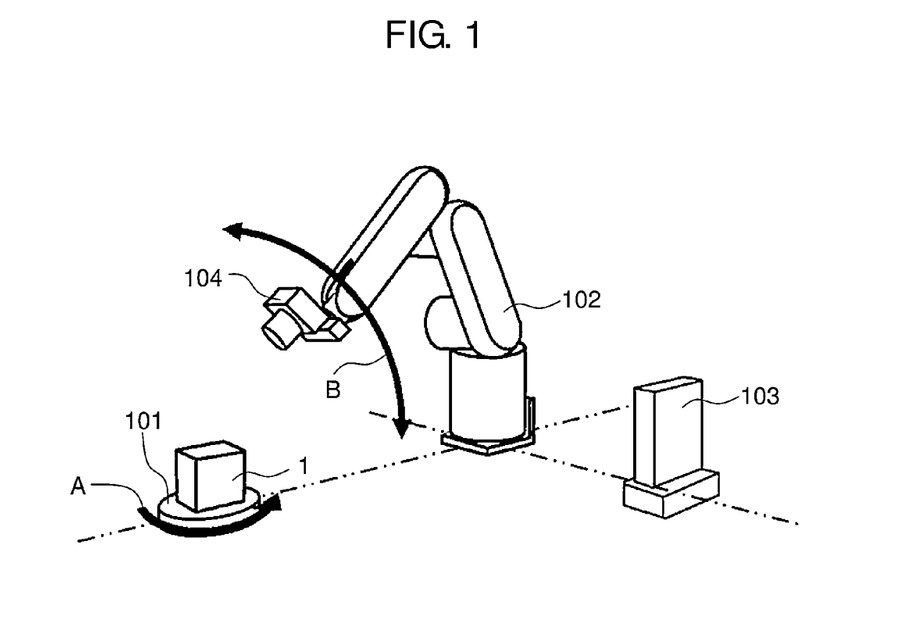
FIG. 1 is a schematic diagram illustrating a whole configuration of an image capturing apparatus according to a first exemplary embodiment of the present technique.

FIG. 1 is a schematic diagram illustrating a whole configuration of the image capturing apparatus according to the first exemplary embodiment of the present technique. As illustrated in FIG. 1, turntable 101 is configured to fix object 1 and turn object 1 in a longitudinal direction of object 1 as shown by arrow A. Robot arm 102 is configured to move camera 104 attached to tip of robot arm 102 in a latitudinal direction of object 1 as shown by arrow B, and also configured to control an attitude of camera 104 so as to cause an optical axis of camera 104 to point toward object 1. Control equipment 103 such as a personal computer controls turntable 101, robot arm 102, and camera 104.

In conjunction with the devices, camera 104 captures images of object 1 placed on turntable 101.

[1-2. Functional Block of Image Capturing Apparatus]

Figure 2:
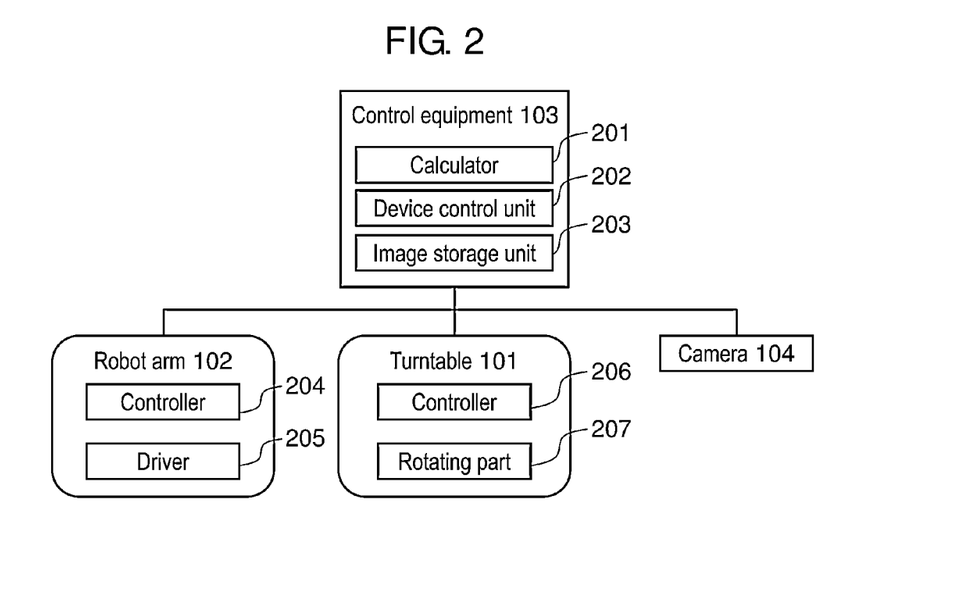
FIG. 2 is a functional block diagram of the image capturing apparatus according to the first exemplary embodiment.

FIG. 2 is a functional block diagram of the image capturing apparatus according to the first exemplary embodiment. As illustrated in FIG. 2, control equipment 103 has calculator 201 which calculates the latitude and longitude of a viewpoint from which an image of an object is to be captured, device control unit 202, and image storage unit 203. Robot arm 102 has driver 205 including a motor and the like, and controller 204 which receives a control signal from control equipment 103 and controls driver 205 according to an instruction from control equipment 103.

Turntable 101 has rotating part 207 which supports object 1 and is rotated in the longitudinal direction by a motor or the like, and controller 206 which receives a control signal from control equipment 103 and controls rotating part 207 according to an instruction from control equipment 103.

Further, control equipment 103 controls camera 104. For example, control equipment 103 issues an instruction to release a shutter to camera 104 and imports the captured image data to accumulate the data in image storage unit 203.

[1-3. Method of Controlling Image Capturing Apparatus]

Figure 3:
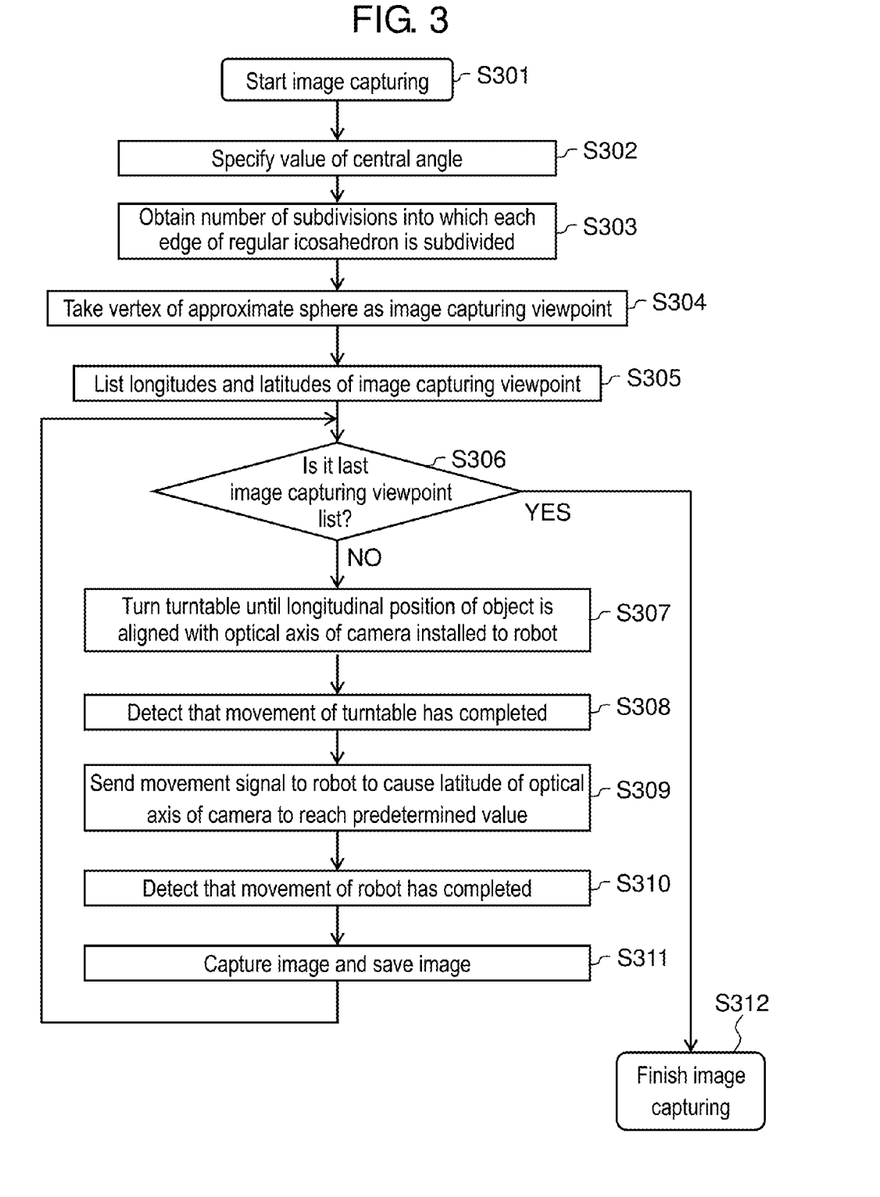
FIG. 3 is a flow chart showing a method of controlling the image capturing apparatus illustrated in FIG. 1 and FIG. 2.

FIG. 3 is a flow chart showing a method of controlling the image capturing apparatus illustrated in FIG. 1 and FIG. 2.

First, a camera position at an image capturing moment, which will be hereinafter referred to as an image capturing viewpoint, is decided by processes from step S302 to step S305 in FIG. 3. A multi-viewpoint image is captured with a plurality of points on a virtual spherical surface which has been set around the object defined as the image capturing viewpoints and with the optical axis of camera 104 caused to point toward object 1 from the image capturing viewpoints.

In the first exemplary embodiment, first, a user specifies a value of a central angle between the image capturing viewpoints adjacent to each other (step S302).

The central angle is an angle between two lines respectively connecting the center of the sphere with points on the spherical surface as the adjacent image capturing viewpoints. The value of the central angle is set small in the case where surroundings of object 1 are precisely shot. A system selects a number of subdivisions into which each edge of the regular icosahedron is subdivided such that each pair of adjacent points in a group of points forms an angle closest to the specified central angle (step S303).

According to the specified number of subdivisions, the system subdivides each edge of the regular icosahedron to form an approximate sphere. The system takes vertices of the formed approximate sphere as the image capturing viewpoints for capturing the multi-viewpoint image (step S304).

Now, processes of obtaining the image capturing viewpoint by subdividing the regular icosahedron in step S303 and step S304 will be described in detail.

Figure 4:
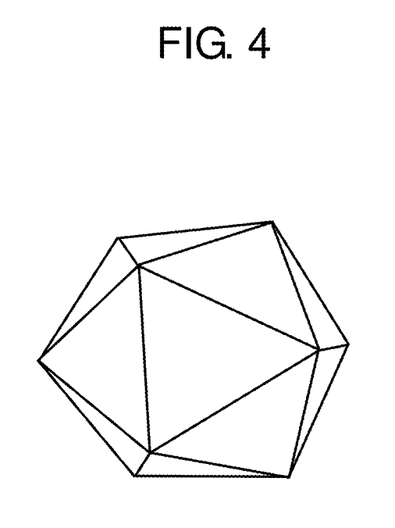
FIG. 4 is a diagram illustrating a regular icosahedron.

FIG. 4 is a diagram illustrating a regular icosahedron. The regular icosahedron is a regular polyhedron with a maximum number of surfaces and is composed of 20 equilateral triangles, 30 edges, and 12 vertices.

As methods of obtaining an approximate sphere from the regular icosahedron, there is known such methods as a method of making a geodesic dome which usually include an alternate subdivision, also referred to as Class I, and a triacon subdivision, also referred to as Class II.

Figure 5:
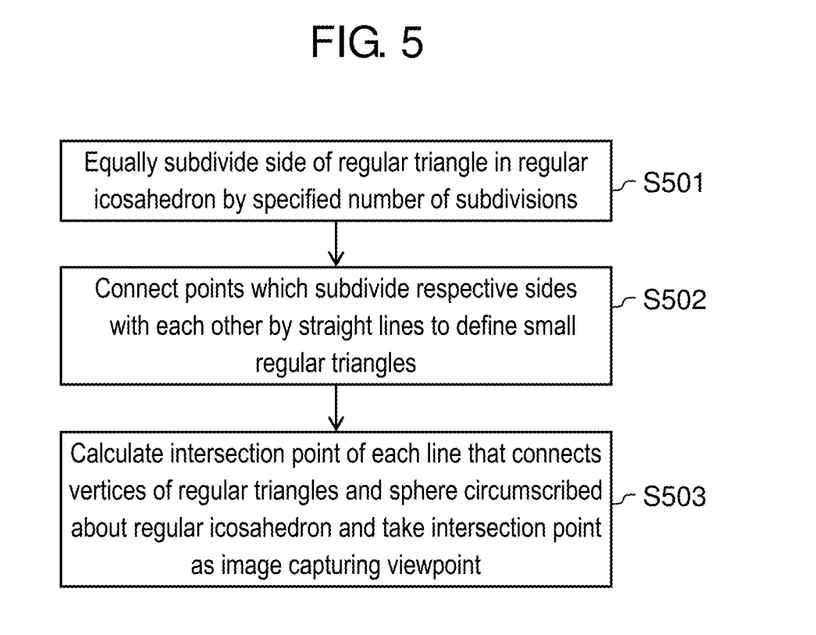
FIG. 5 is a flow chart showing an alternate subdivision method.
Figure 6:
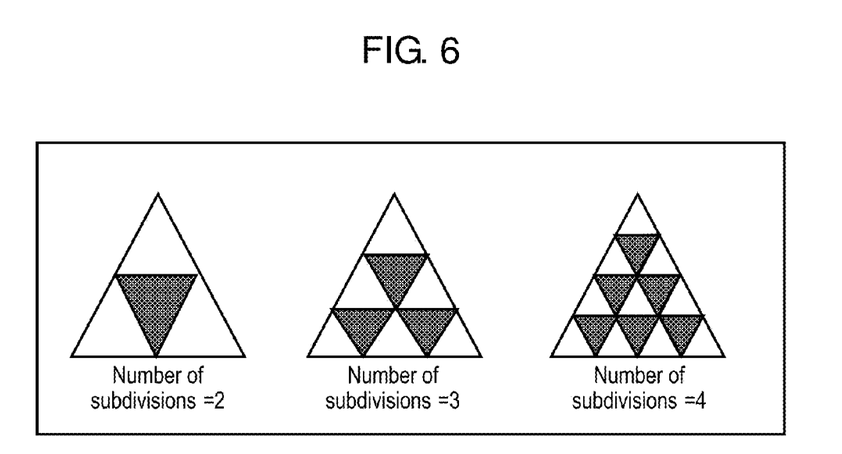
FIG. 6 is an illustration for describing the alternate subdivision method.
Figure 7:
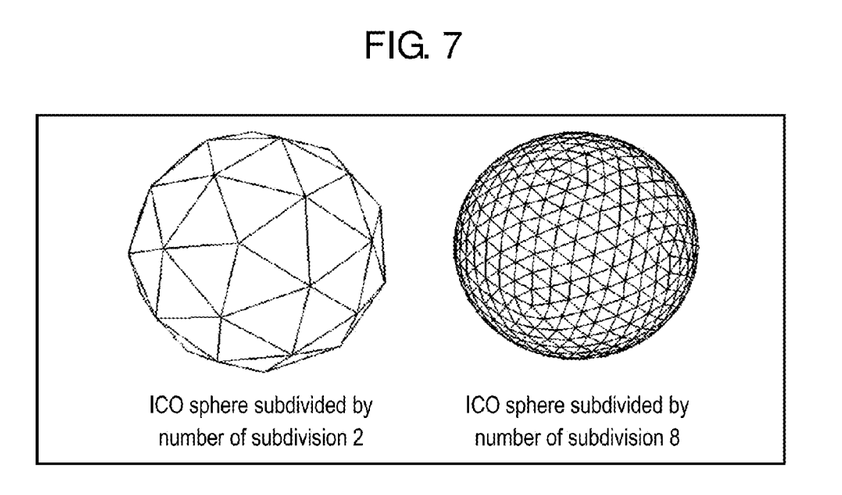
FIG. 7 is an illustration for describing the alternate subdivision method.

FIG. 5, FIG. 6, and FIG. 7 are explanatory views for describing the alternate subdivision method.

FIG. 5 is a flow chart showing alternate subdivision process steps.

As shown in FIG. 5, first, the system equally subdivides a side of a regular triangle in the regular icosahedron by the specified number of subdivisions (step S501).

Next, the system connects points which subdivide the respective sides with each other by straight lines to define small regular triangles which have vertices at intersection points of the straight lines (step S502). In that process, on condition that the number of subdivisions is n, the regular triangle is subdivided into small regular triangles by the number of the square of n. FIG. 6, which shows the regular triangles subdivided in that manner, is an illustration for describing a case where the regular triangles are respectively subdivided by the number of subdivisions of 2, 3, and 4.

the system calculates an intersection point of each line that connects the center of a sphere circumscribed about the regular icosahedron with each vertex of the regular triangles resulting from the subdivision and the sphere circumscribed about the original regular icosahedron and takes the intersection points as the image capturing viewpoints (step S503).

In the first exemplary embodiment, an approximate sphere obtained from the regular icosahedron by the alternate subdivision, the triacon subdivision to be described later, or any other similar methods is referred to as ICO sphere. FIG. 7 is an illustration for describing the ICO sphere subdivided by the number of subdivision 2 and the ICO sphere subdivided by the number of subdivision 8.

Figure 8:
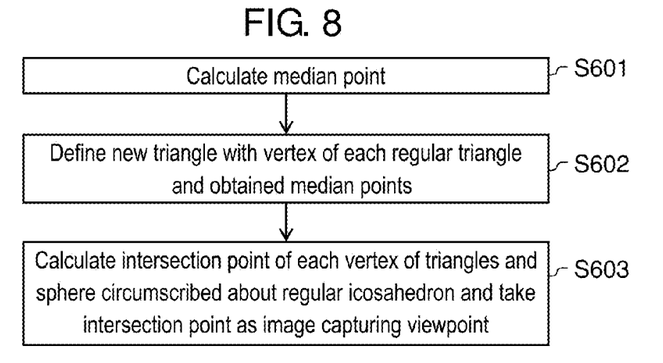
FIG. 8 is a flow chart showing a triacon subdivision method.
Figure 9:
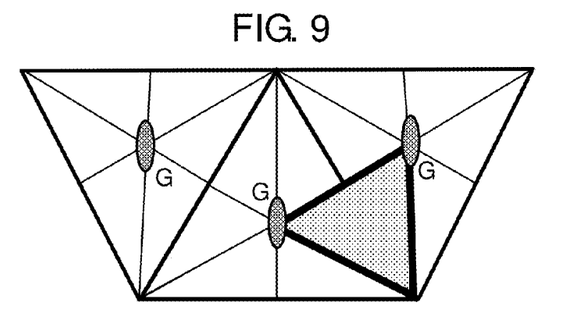
FIG. 9 is an illustration for describing the triacon subdivision method.
Figure 10:
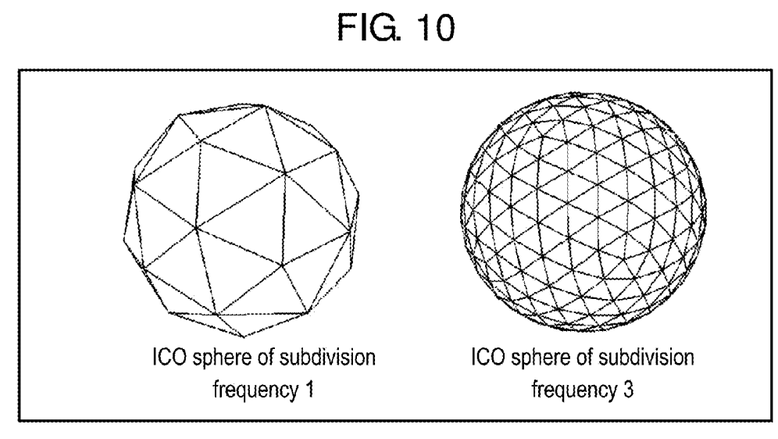
FIG. 10 is an illustration for describing the triacon subdivision method.

FIG. 8, FIG. 9, and FIG. 10 are explanatory views for describing the triacon subdivision method.

FIG. 8 is a flow chart showing triacon subdivision process steps.

As shown in FIG. 8, first, the system calculates median point G of each regular triangle in the regular icosahedron by drawing a bisector from each vertex of each regular triangle to an opposite side of the vertex (step S601).

Next, the system defines each new triangle with three points including a vertex of each regular triangle, median point G of the regular triangle having the vertex, and median point G of the adjacent regular triangle which shares the vertex of the triangle with the preceding regular triangle (step S602). FIG. 9 is an illustration for describing a method of defining a triangle by using the triacon subdivision.

The system calculates an intersection point of each vertex of the regular triangles resulting from the subdivision and the sphere circumscribed about the original regular icosahedron and takes the intersection points as the image capturing viewpoints (step S603).

FIG. 10 is an illustration for describing the ICO sphere of a subdivision frequency 1 and the ICO sphere of a subdivision frequency 3.

Like those examples, in the triacon subdivision method, the system is able to increase a number of vertices of the ICO sphere by repeating the subdivision process a plurality of times.

Here, it is assumed that the alternate subdivision method shown in FIG. 6 is used as the specifying method from step S302 to step S305 in FIG. 3, and thus, in step S303, the system obtains the number of subdivisions into which each edge of the regular icosahedron is subdivided. However, in a case where the triacon subdivision method is used, the system obtains the subdivision frequency.

Now, specific numerical values for step S303 are shown in Table 1.

TABLE 1

| The number of subdivisions for an edge | Central angle formed between two vertices (deg) | The number of vertices of hemisphere (appropriate number) |
| --- | --- | --- |
| Regular icosahedron | 63.3 | 6 |
| 2 | 31.7 to 36.0 | 21 |
| 4 | 15.9 to 18.7 | 81 |
| 8 | 7.9 to 9.3 | 321 |
| 16 | 4.0 to 4.7 | 1281 |

Table 1 shows a relationship between the number of subdivisions for an edge in the alternate subdivision and a central angle formed between the adjacent points of the ICO sphere subdivided by that number of subdivisions. According to Table 1, the system is able to calculate an appropriate number of subdivisions for an edge from the user-specified central angle to be formed between the vertices.

The system converts the obtained image capturing viewpoints into longitudes and latitudes and lists them (step S305). The list is preferably sorted in, for example, ascending order of the longitude such that the system is enabled to accomplish the image capturing which is to be performed later in a short time by moving turntable 101 and robot arm 102.

The steps from S306 to S311 are processes of capturing the images of object 1 from the specified image capturing viewpoints by using the obtained image capturing viewpoint list to drive turntable 101 and robot arm 102.

In step S306, the system determines whether the list is a last image capturing viewpoint list or not. First, the system sends a signal to controller 206 of turntable 101 to turn turntable 101 until a longitudinal position of object 1 is aligned with the optical axis of camera 104 installed to the robot (step S307).

Next, the system detects that the movement of turntable 101 has completed or waits for a certain time period (step S308).

Next, the system sends a signal to a controller of the robot to send a movement signal to the robot so as to cause the latitude of the optical axis of camera 104 with respect to a rotation axis of turntable 101 to reach a predetermined value (step S309).

Next, the system detects that the movement of the robot has completed or waits for a certain time period (step S310).

Then, the system sends a signal to camera 104 to release a shutter and capture an image. The system saves image data of the captured image in image storage unit 203 (step S311).

The system repeats the processes from step S307 to step S311 by the number of viewpoints on the image capturing viewpoint list (step S306 and step S312).

[1-4. Effects and the Like]

Disclosed in the first exemplary embodiment is a method of using the vertices of the ICO sphere as viewpoint positions for capturing the multi-viewpoint image. Since the vertices of the ICO sphere spread out over the spherical surface in an approximately uniform density, the multi-viewpoint image capturing by using these vertices as the image capturing viewpoints can realize image capturing of the object exhaustively around the whole object, or can realize image capturing of the object without excessively increasing the image capturing viewpoints.

Further, by using the group of images captured from the vertex positions on the ICO sphere of the method disclosed in the first exemplary embodiment, the method can provide an effect of allowing the user to optionally set the rotation axis of the object to move the viewpoint when the multi-viewpoint image is displayed.

Figure 11:
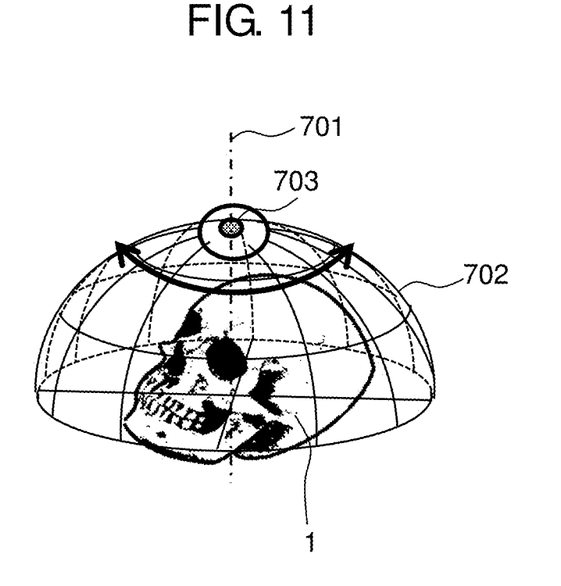
FIG. 11 is an illustration for describing an effect of setting a rotation axis of an object for moving a viewpoint in displaying a multi-viewpoint image.
Figure 12:
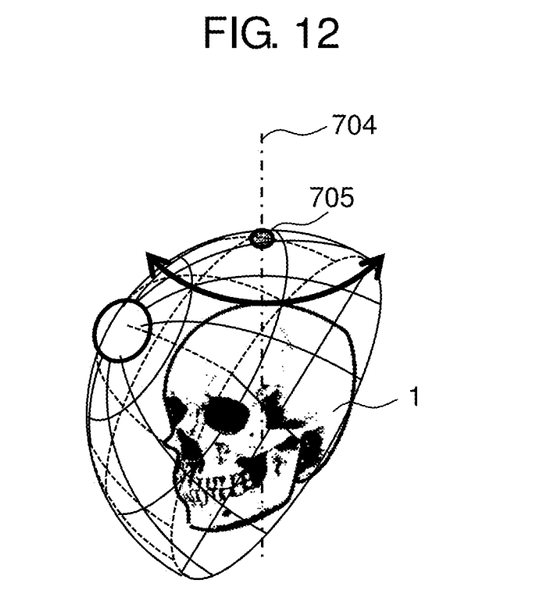
FIG. 12 is an illustration for describing an effect of setting a rotation axis of an object for moving a viewpoint in displaying a multi-viewpoint image.

FIG. 11 and FIG. 12 are illustrations for describing the effect of setting the rotation axis of the object for moving the viewpoint in displaying the multi-viewpoint image.

FIG. 11 illustrates a spherical surface composed of image capturing viewpoints for capturing a multi-viewpoint image, and a rotation axis of the sphere. The multi-viewpoint image captured by the image capturing apparatus illustrated in FIG. 1 includes images of object 1 captured from points on a surface of virtually set hemisphere 702 with camera 104 always revolving around object 1 on axis 701 passing through north pole 703. Camera 104 is oriented such that north pole 703 of hemisphere 702 always comes to the top of the image.

However, there is a case where the above-described multi-viewpoint image is displayed with the orientation of the image different from that of the image being captured, i.e., the above-described multi-viewpoint image is displayed in a direction of line of sight movement. FIG. 12 shows an example of the case. FIG. 12 is based on an assumption that images of a skull specimen have been captured as the object from a plurality of viewpoints and are displayed for the user. In the example, when the multi-viewpoint image is displayed for the user, the method changes an attitude of the skull specimen as object 1 in the image to display the skull specimen in a standing position, i.e., to align rotation axis 704 of object 1 with a vertical direction of a display screen, and changes the images to turn object 1 on rotation axis 704, so that the user can observe the image as if the skull specimen is really in front of the user. The method realizes the above-described display of the multi-viewpoint image by moving the rotation axis of object 1 to rotation axis 704 passing through point 705 which is different from axis 701 passing through north pole 703 used in the image capturing.

Further, in order to realize the above-described display, the image capturing viewpoints for capturing the multi-viewpoint image preferably spread almost uniformly over a spherical surface that has the image capturing viewpoints, i.e., hemisphere 702 illustrated in FIG. 11. On condition that the multi-viewpoint image contains a part in which the image is densely captured and a part in which the image is coarsely captured, the user cannot sufficiently observe a target displayed as the object.

Using of the image captured by the image capturing method according to the first exemplary embodiment eliminates variation in the density of the image capturing viewpoints and ensures sufficient observation of the target whichever orientation the rotation axis of the image to be displayed is set.

Second Exemplary Embodiment

An image display method of the present technique is an image display method including displaying a multi-viewpoint image of an object which has been captured from a plurality of different viewpoints by sequentially changing a display of the multi-viewpoint image according to a user operation, wherein when the multi-viewpoint image of the object is captured, the object is placed at a center of a virtually set ICO sphere, and images of the object are captured from vertices of the virtually set ICO sphere of the object toward the center of the ICO sphere such that a plurality of still images are generated, and when the multi-viewpoint image is displayed, the plurality of images are controlled to be displayed, the plurality of images having been captured with a rotation axis of the object set and with the object being rotated about the rotation axis.

[2-1. Configuration of Display Device]

Figure 13:
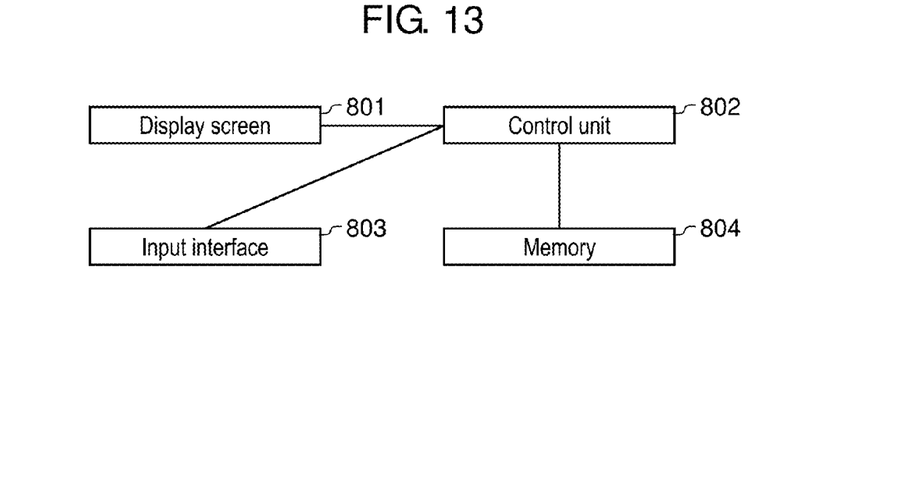
FIG. 13 is a block diagram showing a configuration of a display device according to a second exemplary embodiment.

FIG. 13 is a block diagram showing a configuration of a display device according to the second exemplary embodiment. As illustrated in FIG. 13, control unit 802 is connected with display screen 801, input interface 803, and memory 804.

[2-2. Functional Block of Display Device]

Figure 14:
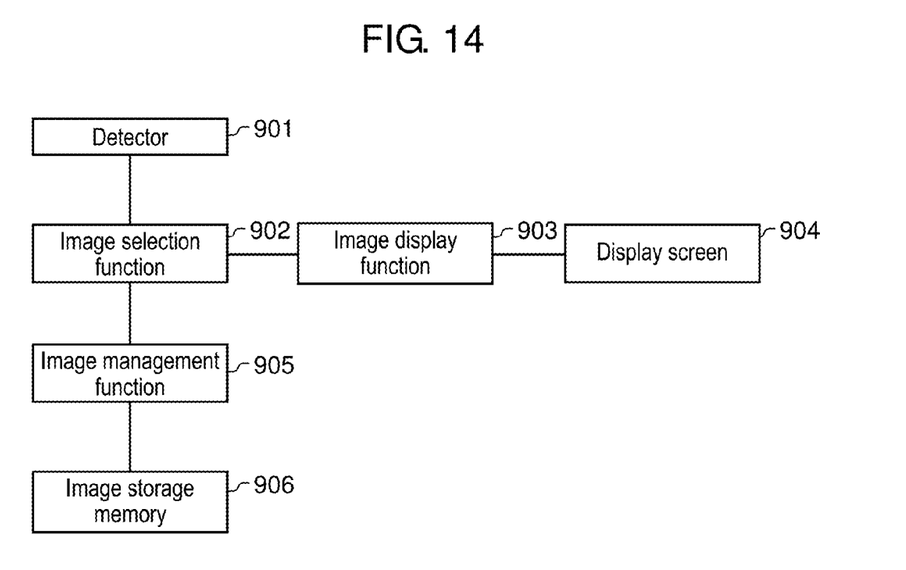
FIG. 14 is a functional block diagram of the display device according to the second exemplary embodiment.

FIG. 14 is a functional block diagram of the display device according to the second exemplary embodiment.

As illustrated in FIG. 14, the display device has detector 901 which detects a user operation, image selection function 902, image management function 905, and image storage memory 906. In response to the user operation provided from detector 901, image selection function 902 issues a request for image selection to image management function 905.

Image management function 905 is implemented by a tabular database, for example, and contains information about latitudes and longitudes of the image capturing viewpoints for capturing the multi-viewpoint image, image file name, and the like associated with each other.

Image management function 905 selects an appropriate image from image storage memory 906. In response to reception of the image selection result, image selection function 902 sends corresponding image data to image display function 903 and the image represented by the image data is displayed on display screen 904.

[2-3. Method of Controlling Image Capturing Apparatus]

Figure 15:
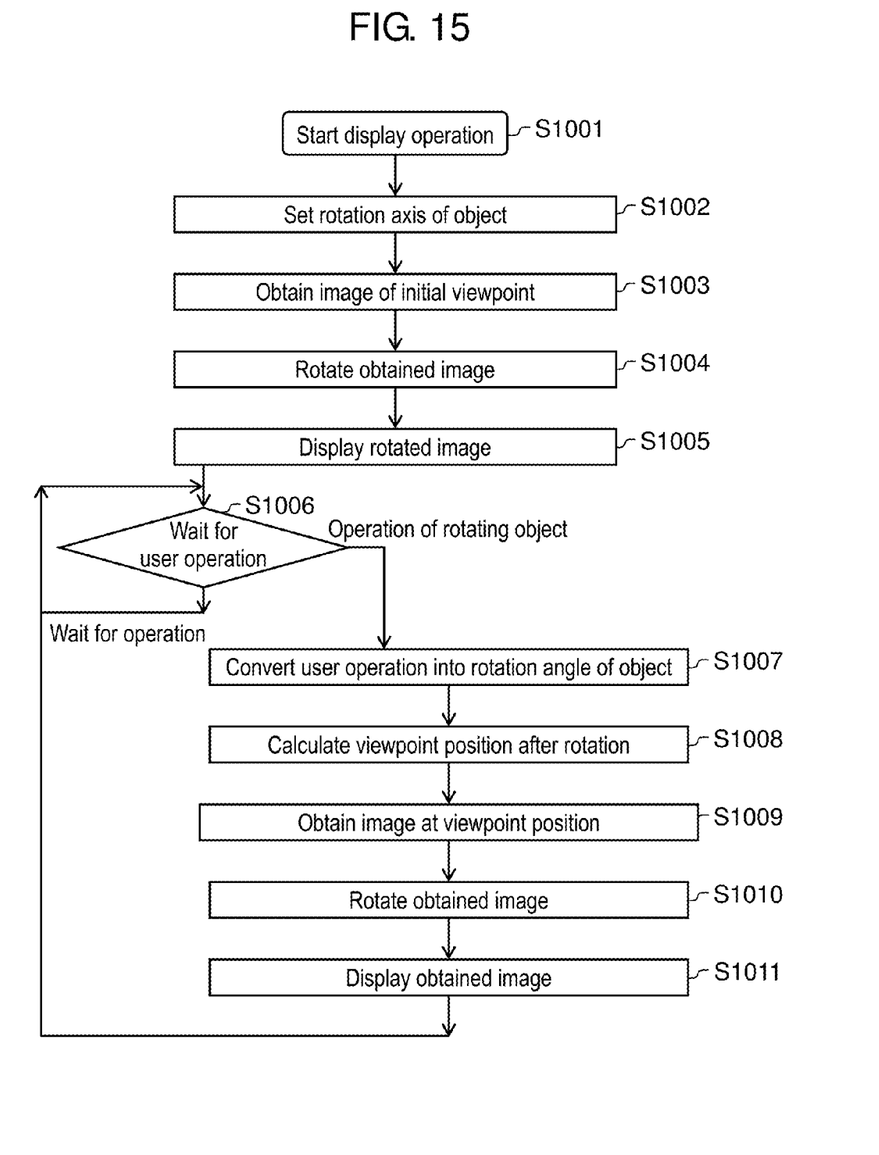
FIG. 15 is a flow chart showing a method of controlling the display device which has the configurations shown in FIG. 13 and FIG. 14.

FIG. 15 is a flow chart showing a method of controlling the display device which has the configurations shown in FIG. 13 and FIG. 14.

A system starts a display operation (step S1001), and first, the system decides a rotation axis of an object (step S1002).

The rotation axis of the object, which is a virtual rotation axis for the display device to respond to a user operation by changing the images of the multi-viewpoint image to turn the object on the axis in the image, is defined as a straight line passing through the center of the sphere of the spherical surface which is composed of the image capturing viewpoints for capturing the multi-viewpoint image.

The rotation axis of the object may be set by the user for an intended purpose each time the user is to watch the multi-viewpoint image, or may be previously set for an intended purpose for each group of images of a multi-viewpoint image so that the user selects one of the previously set rotation axes.

Next, the system decides an initial viewpoint for the display and selects an image to display first (step S1003).

The initial viewpoint may be decided by the user, or may be previously registered as a direction of line of sight that most effectively shows characteristics of a displayed target to the user so that the user selects one of the previously registered directions of line of sight.

The system rotates the image based on a positional relationship between the rotation axis of the object and the initial viewpoint (step S1004).

Figure 16:
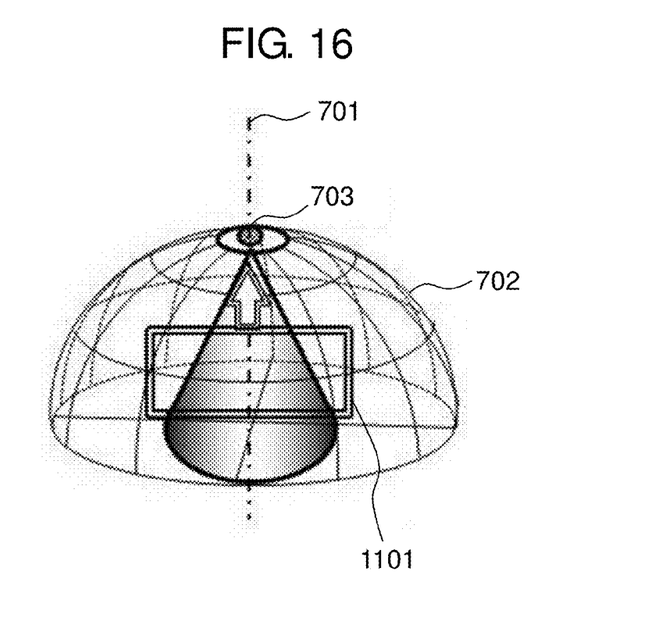
FIG. 16 is an illustration for describing a relationship between the rotation axis of the object and rotation of the image.
Figure 17:
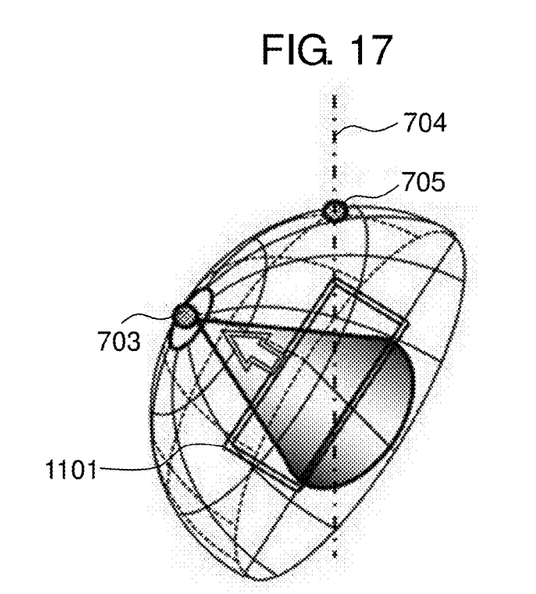
FIG. 17 is an illustration for describing a relationship between the rotation axis of the object and the rotation of the image.

FIG. 16 and FIG. 17 are illustrations for describing a relationship between the rotation axis of the object and the rotation of the image. In FIG. 16 and FIG. 17, the same reference numbers are given to the same parts as those illustrated in FIG. 11 and FIG. 12.

FIG. 16 illustrates an orientation of an image being captured. Since camera 104 is positioned such that north pole 703 of hemisphere 702 comes to the top, the image to be captured is usually contained within doublet square 1101.

FIG. 17 illustrates a case where the system displays the multi-viewpoint image by changing an operation rotation axis to rotation axis 704 and aligning rotation axis 704 of object 1 with a vertical direction of display screen 904.

Incidentally, since image 1101 is captured with north pole 703 of the sphere at the top, the system has to rotate image 1101 to maintain the positional relationship of image 1101 being captured. The system displays the multi-viewpoint image by rotating the image until the position of north pole 703 of hemisphere 702 being captured comes to the top of image 1101. In FIG. 17, image 1101 is rotated counterclockwise such that north pole 803 before the rotation axis of the object is changed comes to the top of the image in the case where the rotation axis of the object is changed.

As shown in FIG. 15, the system displays the image obtained in the above-described manner (step S1005). By the above-described processes from step S1002 to step S1005, an image at an initial viewpoint is displayed.

Subsequently, by the processes from step S1006 to step S1010, the system sequentially displays images according to the user operation. In step S1006, the system waits for an input from the user.

In response to a user operation, the system converts a manipulated variable of the user operation into rotational movements of latitude and longitude of the object. The user operation is input as a movement of a dragged mouse, a rotation angle of a mouse wheel, or a drag operation on a touch panel, for example. The system converts the user operation into a rotation angle of the object (step S1007), and the system calculates a viewpoint position after the rotation (step S1008). Then, the system obtains the image at the viewpoint position after the rotation (step S1009), and the system rotates the image obtained by the method illustrated in FIG. 17 (step S1010).

The system displays the rotated image (step S1011), and the system waits for a user operation again (step S1006).

[2-4. Effects and the Like]

As described above, it is assumed that the display device according to the second exemplary embodiment has a function of setting the rotation axis of the object and a function of rotating the image to be displayed so as to maintain the orientation of the image being captured.

With these functions, the display device is able to set the axis of rotation of the object to be displayed to an axis different from the axis of rotation of image capturing viewpoints for capturing the multi-viewpoint image.

Now, another exemplary embodiment will be described with reference to FIG. 18 to FIG. 20.

Figure 18:
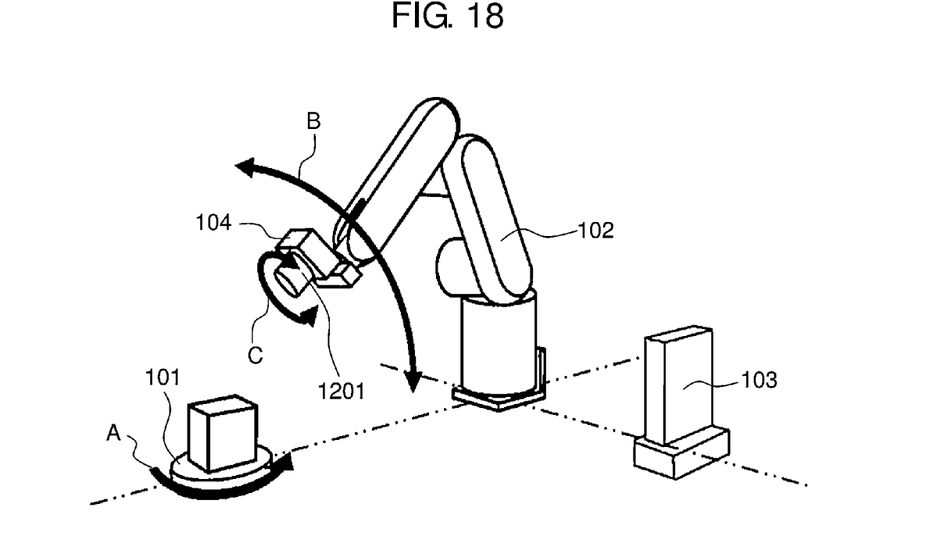
FIG. 18 is a schematic diagram illustrating another exemplary embodiment of the image capturing apparatus.

FIG. 18 is a schematic diagram illustrating another exemplary embodiment of the image capturing apparatus. In an example illustrated in FIG. 18, the image capturing apparatus has camera rotation motor 1201 which is able to rotate the orientation of camera 104 without changing the optical axis of camera 104 in addition to the devices illustrated in FIG. 1. In FIG. 18, arrow C indicates a direction of rotating the orientation of camera 104.

Figure 19:
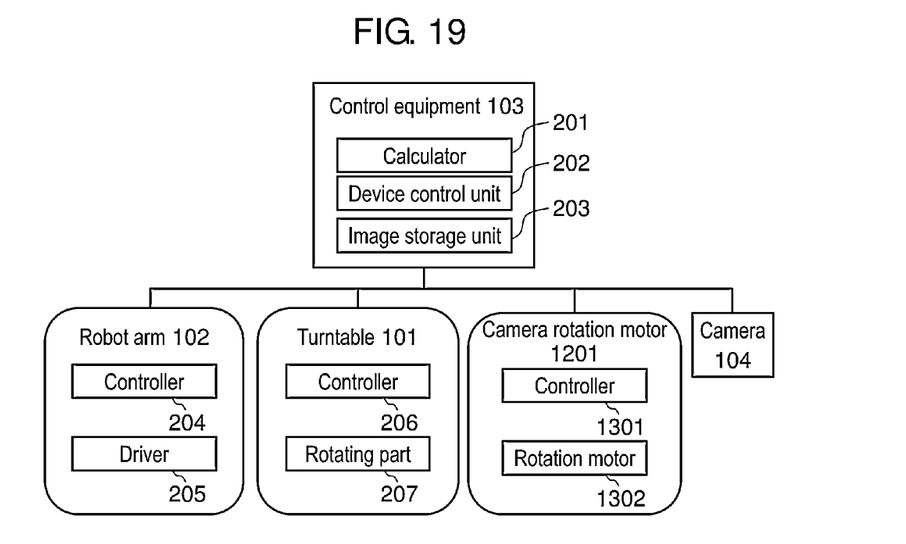
FIG. 19 is a functional block diagram of the image capturing apparatus illustrated in FIG. 18.

FIG. 19 is a functional block diagram of the image capturing apparatus illustrated in FIG. 18. As illustrated in FIG. 19, camera rotation motor 1201 is added to the functional block diagram illustrated in FIG. 2. Control equipment 103 sends a control signal to controller 1301, and according to the control signal, controller 1301 controls drive of rotation motor 1302.

Figure 20:
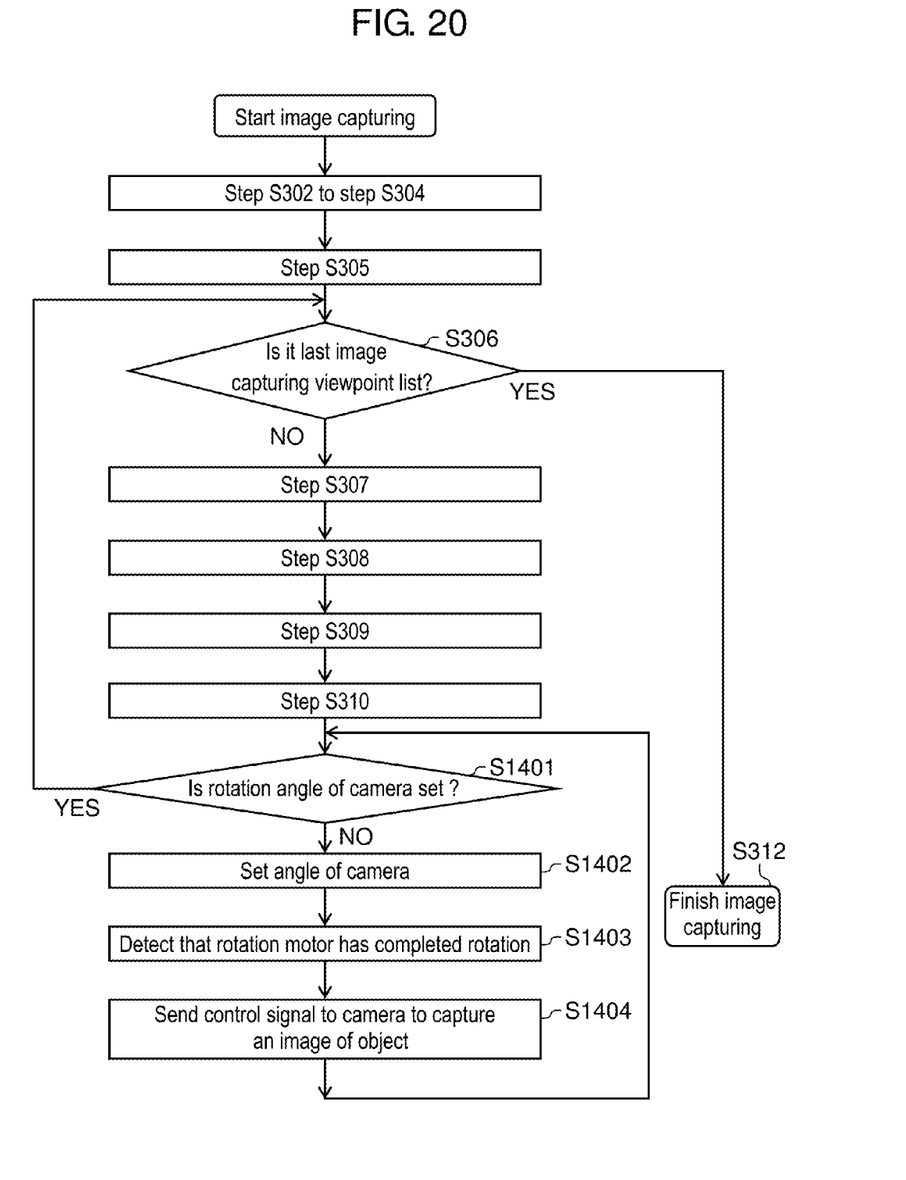
FIG. 20 is a flow chart showing a method of controlling the image capturing apparatus which has the configurations shown in FIG. 18 and FIG. 19.

FIG. 20 is a flow chart showing a method of controlling the image capturing apparatus which has the configurations shown in FIG. 18 and FIG. 19. In FIG. 20, the same numbers are given to the same process steps as those shown in FIG. 3. A part from step S1401 to step S1404 is a part relating to control of camera rotation motor 1201.

By performing the processes from S307 to S310, the image capturing apparatus controls turntable 101 and robot arm 102 with respect to the respective decided image capturing viewpoints to move camera 104 to the image capturing viewpoints.

Subsequently, the image capturing apparatus sends a control signal to controller 1301 of rotation motor 1302 to set a tilt of camera 104 to a predetermined angle (step S1402). The image capturing apparatus detects that the operation of changing the tilt of camera 104 has finished and the rotation motor 1302 has completed the rotation (step S1403), and then the image capturing apparatus sends a control signal to camera 104 to capture an image of object 1 (step S1404). The image capturing apparatus captures the multi-viewpoint image by repeating the above-described operation by a number of tilts in a predetermined tilt setting list. The tilt setting list contains, for example, right 45 degrees, 0 degrees, left 45 degrees, for the image capturing apparatus to capture the multi-viewpoint image by tilting camera 104 to these degrees.

Figure 21:
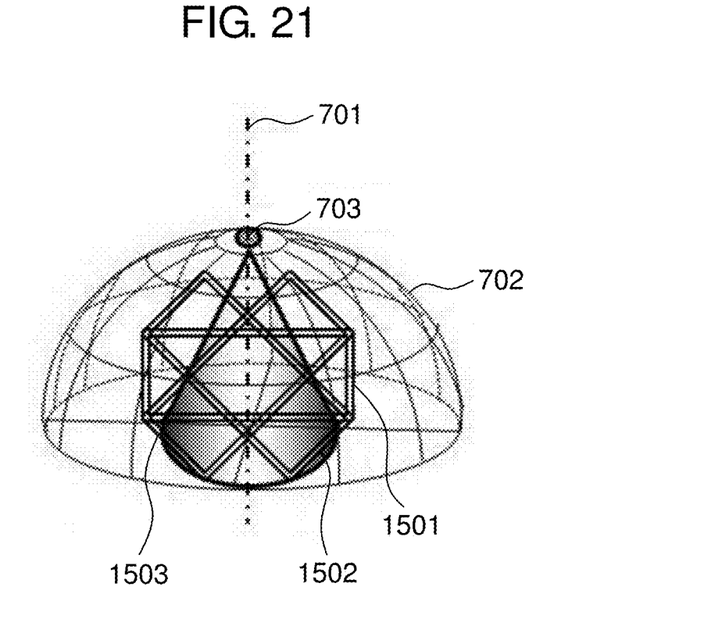
FIG. 21 is an illustration for describing an effect of the image capturing apparatus which has the configurations shown in FIG. 18 and FIG. 19.
Figure 22:
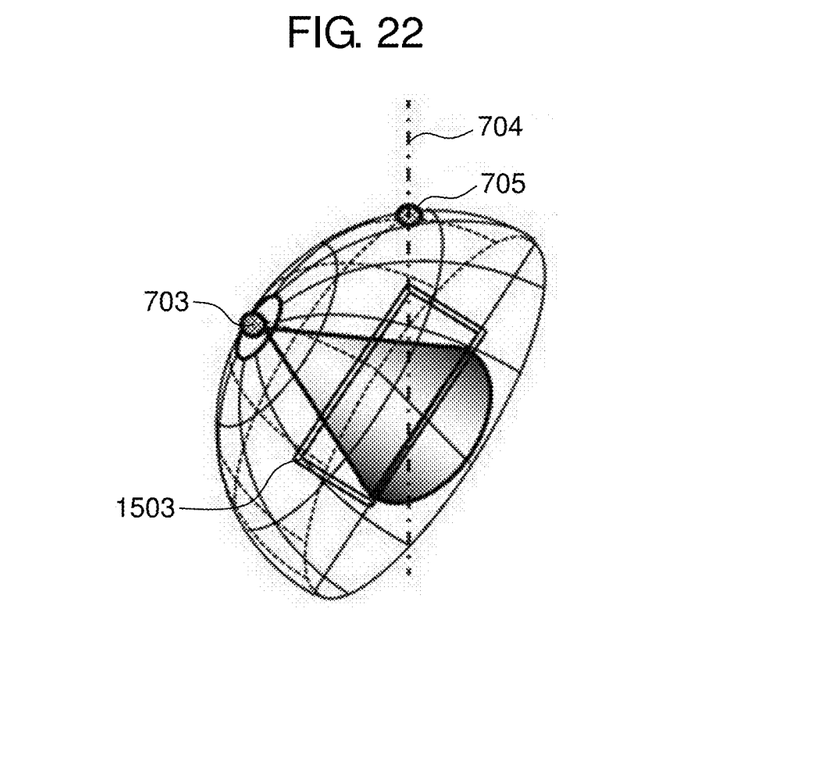
FIG. 22 is an illustration for describing an effect of the image capturing apparatus which has the configurations shown in FIG. 18 and FIG. 19.

In the case where the image capturing apparatus rotates the image described with reference to FIG. 16 by tilting camera 104 to capture the images as described above, it is able to provide a wide effective range for image display. FIG. 21 and FIG. 22 are illustrations for describing an effect of the image capturing apparatus which has the configurations shown in FIG. 18 and FIG. 19.

FIG. 21 illustrates an image captured by a tilted camera. Doublet rectangle 1501 is an image captured by camera 104 tilted to 0 degrees. Doublet rectangle 1502 is an image captured by camera 104 tilted to right 45 degrees. Doublet rectangle 1503 is an image captured by camera 104 tilted to left 45 degrees.

Next, FIG. 22 illustrates a case where the rotation axis of the object is changed to the orientation of rotation axis 704 of object 1 for displaying the image.

When the display device is to display the multi-viewpoint image by aligning rotation axis 704 of object 1 with the vertical direction of display screen 904, the display device rotates the captured images 1501 to 1503 such that a positional relationship between each of the images and north pole 703 of the sphere is the same as that of the image being captured, i.e., the display device rotates the images counterclockwise in the case of FIG. 21 and FIG. 22.

As a result, image 1502 captured by camera 104 tilted to right becomes image 1504 which is image 1502 tilted to left, and therefore, the display device is enabled to display the multi-viewpoint image on display screen 904 continuously.

In the case where images of an object are captured by a camera tilted to a plurality of angles as shown in the operational flow chart of FIG. 20, as to which image is to be selected for display, an image that is to show the object in the widest range on the display screen is preferably selected.

The exemplary embodiments have been described above as examples of the technique of the present technique. For describing those exemplary embodiments, the accompanying drawings and the detailed description have been provided.

As a result, the constituent elements illustrated in the accompanying drawings and discussed in the detailed description may include not only the constituent element necessary to solve the problem but also the constituent element unnecessary to solve the problem in order to exemplify the technology. Therefore, the unnecessary constituent element should not be instantly recognized as a necessary constituent element merely because it is illustrated in the accompanying drawings and described in the detailed description. Also, since the above-described exemplary embodiments are for exemplifying the technique of the present technique, various changes, substitutions, additions, omissions and the like may be performed on the exemplary embodiments without departing from the scope of the claims and the equivalent of the claims.

The present technique can be applied to a multi-viewpoint image capturing apparatus that captures images of an object from a plurality of surrounding viewpoints so that it can display the images to a user in conjunction with a user operation, and a display device.

What is claimed is:

1. A multi-viewpoint image capturing method for controlling an image capturing apparatus comprising: a camera for capturing an image of an object; an arm for moving the camera in a latitudinal direction; and a table for moving the camera in a longitudinal direction, in order to capture multi-viewpoint images, the method comprising:
    placing the object at a center of a virtually set icosahedron (ICO) sphere;
    in accordance with a central angle between image capturing viewpoints adjacent to each other, obtaining a number of divisions into which each edge of the ICO sphere is divided;
    setting image capturing viewpoints at vertexes obtained by dividing each edge of the ICO sphere in accordance with the number of divisions;
    setting latitudinal and longitudinal information of the ICO sphere to each image capturing viewpoint to control the arm and the table;
    moving the arm and rotating the table to set the camera at each image capturing view point based on the latitudinal and longitudinal information, the camera being controlled to move on a surface of the ICO sphere and being directed to the center of the ICO sphere; and
    capturing images of the object at the respective image capturing viewpoints.

2. The multi-viewpoint image capturing method according to claim 1, wherein when the images of the object are captured from the vertex of the ICO sphere toward the center of the ICO sphere, the images of the object are captured with the camera tilted to a plurality of different angles at one shooting position, so that the plurality of still images are generated.

* * * * *